(12) United States Patent
Gibbs et al.

(10) Patent No.: US 8,041,825 B2
(45) Date of Patent: Oct. 18, 2011

(54) SYSTEM AND METHOD FOR A POLICY ENFORCEMENT POINT INTERFACE

(75) Inventors: Andrew Gibbs, Andover, MA (US); Shaji E. Radhakrishnan, Nashua, NH (US); Kuntal Chowdhury, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 946 days.

(21) Appl. No.: 11/584,450

(22) Filed: Oct. 20, 2006

(65) Prior Publication Data

US 2007/0094712 A1    Apr. 26, 2007

Related U.S. Application Data

(60) Provisional application No. 60/729,415, filed on Oct. 20, 2005, provisional application No. 60/777,960, filed on Mar. 1, 2006, provisional application No. 60/780,023, filed on Mar. 6, 2006.

(51) Int. Cl.
*G06F 15/177* (2006.01)
*G06F 15/173* (2006.01)
*G06F 15/16* (2006.01)
*G06F 17/00* (2006.01)
*G06F 17/30* (2006.01)
*H04L 29/06* (2006.01)

(52) U.S. Cl. ........ 709/229; 709/220; 709/221; 709/222; 709/223; 709/224; 709/225; 709/226; 709/227; 709/228; 713/150; 713/164; 713/165; 713/166; 713/167; 726/1; 726/2; 726/3; 726/4; 726/5; 726/6; 726/7

(58) Field of Classification Search .......... 709/220–229; 713/150, 164–167; 726/1–7
See application file for complete search history.

(56) References Cited

U.S. PATENT DOCUMENTS 6,373,817 B1    4/2002    Kung et al.
(Continued)

FOREIGN PATENT DOCUMENTS

WO    2007097836    8/2007

OTHER PUBLICATIONS

International Search Report and Written Opinion issued for corresponding International Application No. PCT/US2006/041195.

(Continued)

*Primary Examiner* — Melanie Jagannathan
*Assistant Examiner* — Kai Chang
(74) *Attorney, Agent, or Firm* — Wilmer Cutler Pickering Hale and Dorr LLP

(57) ABSTRACT

Systems and methods for providing an interface to communicate policy information from a policy server to a policy enforcement point are presented. An external policy server is used to implement and provide various policies to a policy enforcement point for enforcement on subscriber sessions and traffic flows of a mobile subscriber. A policy enforcement point can request instructions from the policy server using an access-request message and receive from the policy server unsolicited instructions with a change-of-authorization message. Policies for application to a subscriber session or traffic flow are included in the message from a policy server to the policy enforcement point. Other messages such as a disconnect message are used to terminate a subscriber session.

16 Claims, 11 Drawing Sheets

U.S. PATENT DOCUMENTS

| | | | |
|---|---|---|---|
| 6,564,061 B1 | 5/2003 | Guo et al. | |
| 6,578,076 B1* | 6/2003 | Putzolu | 709/223 |
| 6,728,208 B1 | 4/2004 | Puuskari | |
| 6,829,473 B2* | 12/2004 | Raman et al. | 455/406 |
| 6,940,836 B2 | 9/2005 | Borella et al. | |
| 7,106,756 B1* | 9/2006 | Donovan et al. | 370/468 |
| 7,155,215 B1 | 12/2006 | Miernik et al. | |
| 7,409,447 B1* | 8/2008 | Assadzadeh | 709/225 |
| 2002/0010861 A1 | 1/2002 | Matsuyama et al. | |
| 2002/0062379 A1* | 5/2002 | Widegren et al. | 709/227 |
| 2002/0143911 A1* | 10/2002 | Vicente et al. | 709/223 |
| 2003/0204596 A1* | 10/2003 | Yadav | 709/226 |
| 2004/0006613 A1 | 1/2004 | Lemieux et al. | |
| 2004/0057420 A1* | 3/2004 | Curcio et al. | 370/352 |
| 2004/0073928 A1* | 4/2004 | Alakoski et al. | 725/62 |
| 2004/0107360 A1* | 6/2004 | Herrmann et al. | 713/201 |
| 2005/0002335 A1* | 1/2005 | Adamczyk et al. | 370/230 |
| 2005/0021978 A1* | 1/2005 | Bhat et al. | 713/182 |
| 2005/0041584 A1* | 2/2005 | Lau et al. | 370/235 |
| 2005/0064821 A1 | 3/2005 | Hedberg et al. | |
| 2005/0141527 A1 | 6/2005 | Gateva et al. | |
| 2005/0169171 A1 | 8/2005 | Cheng et al. | |
| 2005/0278447 A1* | 12/2005 | Raether et al. | 709/227 |
| 2006/0013136 A1* | 1/2006 | Goldschmidt et al. | 370/235 |
| 2006/0041666 A1* | 2/2006 | Karremans | 709/229 |
| 2007/0036078 A1 | 2/2007 | Chowdhury et al. | |
| 2007/0195788 A1 | 8/2007 | Vasamsetti et al. | |
| 2008/0194241 A1* | 8/2008 | Kretz | 455/417 |

OTHER PUBLICATIONS

Fourth Amended Complaint, UTSTARCOM, Inc., vs. Starent Networks, Corp., et al., in the United States District Court for the Northern District of Illinois Eastern Division, Case 1:07-cv-02582, Document 207, Filed Sep. 25, 2008, pp. 1, 48, 70, 71 and 91.

3GPP2 A.S0017-C, Version 1.0, Interoperability Specification (IOS) for cdma2000 Access Network Interfaces—Part 7 (A10 and A11 Interfaces), Feb. 2005.

3GPP2 P.S0001-B, Version 2.0 cdma2000 Wireless IP Network Standard, Sep. 2004.

3GPP2 X.S0011-001-D, Version: 1.0, cdma2000 Wireless IP Network Standard: Introduction, Feb. 2006.

3GPP2 A.S0008-0 v3.0, Interoperability Specification (IOS) for High Rate Packet Data (HRPD) Access Network Interfaces, May 2003.

3GPP2 A.S0008-A v1.0, Interoperability Specification (IOS) for High Rate Packet Data (HRPD) Radio Access Network Interfaces with Session Control in the Access Network, Mar. 2006.

3GPP2 C.S0063-0 v1.0, cdma2000 High Rate Packet Data Supplemental Services, Mar. 2005.

3GPP2 C.S0024-A, Version 2.0, cdma2000 High Rate Packet Data Air Interface Specification, Jul. 2005.

3GPP2 C.R1001-E, Version 1.0, Administration of Parameter Value Assignments for cdma2000 Spread Spectrum Standards, Sep. 30, 2005.

International Search Report and Written Opinion of the International Searching Authority for International Patent Application No. PCT/US2006/30509.

* cited by examiner

SYSTEM AND METHOD FOR A POLICY ENFORCEMENT POINT INTERFACE

CROSS-REFERENCE TO RELATED APPLICATIONS

This application claims benefit of: U.S. Provisional Patent Application No. 60/729,415, filed Oct. 20, 2005, which is hereby incorporated by reference herein in its entirety; U.S. Provisional Patent Application No. 60/777,960, filed Mar. 1, 2006, which is hereby incorporated by reference herein in its entirety; and U.S. Provisional Patent Application No. 60/780,023, filed Mar. 6, 2006, which is hereby incorporated by reference herein in its entirety.

TECHNICAL FIELD OF THE INVENTION

The present invention relates to a system and method of communicating from a policy server to a policy enforcement point. More particularly, the invention provides an interface for an external policy server to communicate policy and other information to a policy enforcement point for application to sessions and data flows.

BACKGROUND OF THE INVENTION

Sometimes in networks, such as wireless networks, it is desirable to allocate network resources according to policies or rules. These policies cover resources such as network bandwidth, Quality of Service (QoS), and security (firewalls). As the content delivered to mobile subscribers (e.g., cell phones, personal digital assistants (PDA), and other handheld devices) becomes more diversified to include Voice over IP (VoIP), streaming media, and multiplayer gaming, these types of content require reliable network connections with fixed parameters. With other types of content, such as email and web surfing, latency and packet loss do not affect the quality of the content delivered as much, and typically the effect is less noticeable. A network with policy-based management uses rules to govern various aspects of the network behavior.

Networks implementing policy-based management typically include a policy decision function and a policy enforcement point. The policy decision function is a resource manager or policy server that is responsible for handling events, making decisions based on those events, and updating the policy enforcement point configuration based on the decisions. The policy enforcement point exists in network nodes such as routers, firewalls, and hosts. The node enforces the policies based on the rule sets received from the policy decision function.

SUMMARY OF THE INVENTION

In accordance with the present invention, certain embodiments feature a system providing policy enforcement on at least one of a subscriber session and a traffic flow comprising a mobile subscriber, a policy enforcement point, and an interface. The mobile subscriber initiates the at least one of a subscriber session and a traffic flow. The policy enforcement point is in communication with the mobile subscriber that establishes the at least one of a subscriber session and a traffic flow and enforces a policy on the at least one of a subscriber session and a traffic flow. The interface to the policy enforcement point is in communication with a policy server, and the policy enforcement point requests a policy from the policy server using an access-request message and receives from the policy server an unsolicited policy with a change-of-authorization message.

Some embodiments feature a method providing policy enforcement on at least one of a subscriber session and a traffic flow comprising initiating from a mobile subscriber at least one subscriber session, establishing the at least one subscriber session on a policy enforcement point in communication with the mobile subscriber, sending an access-request message from the policy enforcement point to a policy server, receiving an access-accept message from the policy server, and applying a policy received in the access-accept message at the policy enforcement point to the at least one subscriber session.

DETAILED DESCRIPTION OF THE INVENTION

Figure 1:
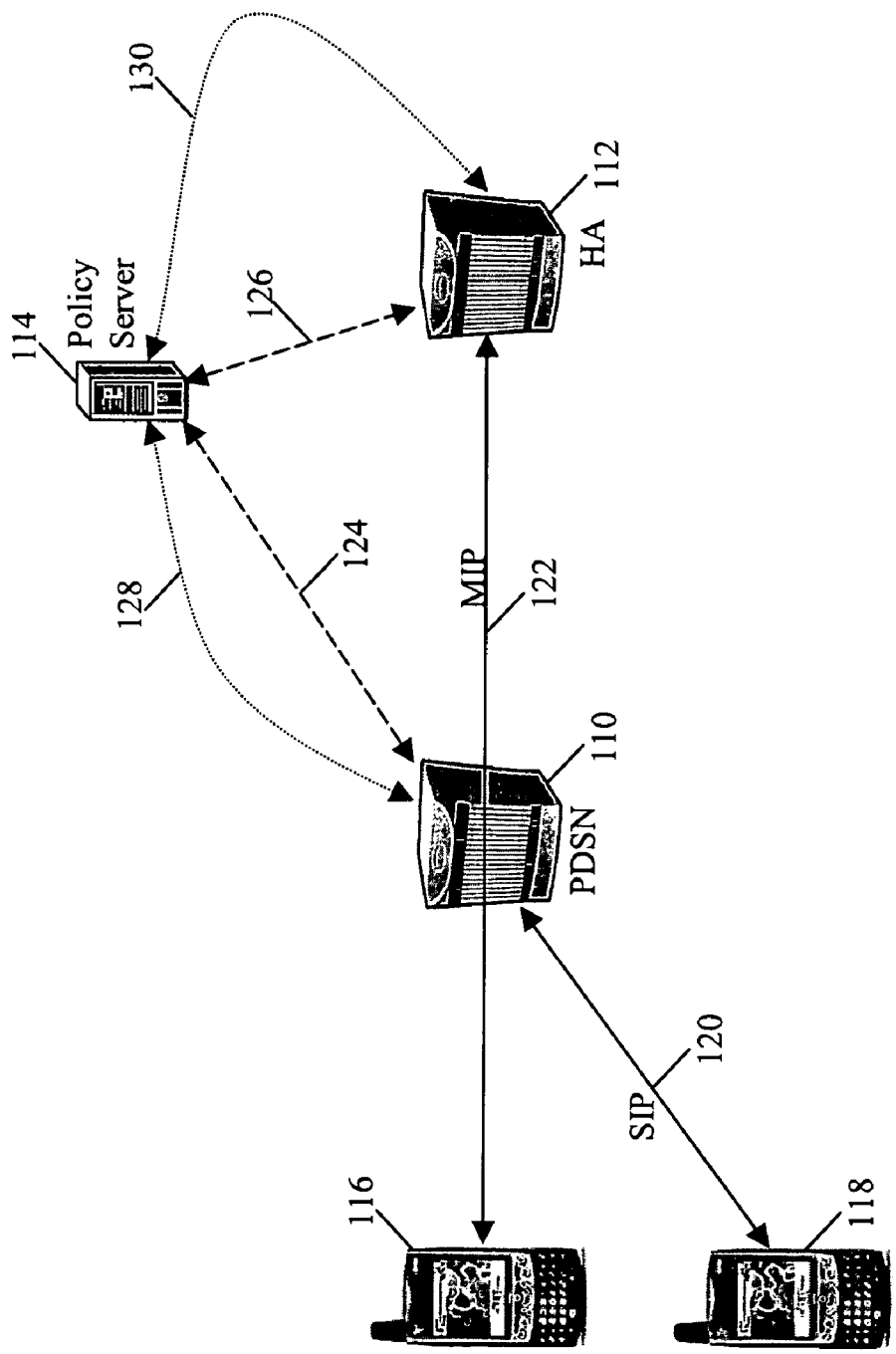
FIG. 1 is a schematic diagram of a network using a policy interface in accordance with certain embodiments of the invention.

The present invention relates to systems and methods of providing an interface to communicate policy information from a policy server to a policy enforcement point in accordance with certain embodiments of the invention. An external policy server can be used to implement and provide various policies to a policy enforcement point for application to a subscriber session and traffic flows of a mobile subscriber. A policy governs the actions taken by a policy enforcement point and how the resources are allocated in some embodiments. A challenge of applying policy rules in a network is ensuring that Quality of Service (QoS), bandwidth, security, and other policies are maintained and do not conflict with one another. While the policy server provides policies, the policies are enforced on traffic flows and subscriber sessions by a policy enforcement point. This policy enforcement point is typically a subscriber-aware edge router in the access network that is capable of receiving policy rules from a policy server and applying the policy rules on subscriber sessions and traffic flows. The policy enforcement point can also use the interface to send information about the subscriber sessions and traffic flows to the policy server.

The communication between a policy server and a policy enforcement point can occur with a PUSH model or a PULL model. In the PUSH model, the policy server sends policy information for an anticipated flow to the policy enforcement point in an unsolicited fashion. In some embodiments of the invention, the policy server uses a Change-of-Authorization message for applying and removing policies for subscriber sessions or associated traffic flows in the policy enforcement point in an unsolicited fashion. A disconnect-message can be used by the policy server for disconnecting the ongoing subscriber sessions or flows in the policy enforcement point in an unsolicited fashion.

In the PULL model, the policy enforcement point solicits policy related information from the policy server for a requested flow and the policy server responds with the policy decision. In certain embodiments, the policy enforcement point can solicit policy decisions from the policy server using an access-request message. This initial access-request message can contain the necessary attributes required for the session and flow identification, initial session setup in the policy server, and an attribute that indicates to the policy server that this is an initial request. A policy enforcement point can send updated information to the policy server with an access-request message whenever there is a change in subscriber session parameters in the policy enforcement point and can request new policies for existing subscriber sessions in some embodiments.

In some embodiments of the invention, the PUSH and PULL messages are Remote Authentication Dial-In User Service (RADIUS) based messages. For example, RADIUS access-request messages and RADIUS Change-of-Authorization messages can be modified for use in interface communication. RADIUS is an authentication, authorization, and accounting (AAA) protocol for applications such as network access or IP mobility and can be used to collect call detail records. A policy server can use the call detail records to decide policy rules for application.

FIG. 1 illustrates a network 100 using a policy interface in accordance with certain embodiments of the invention. The network includes a packet data serving node (PDSN) 110, a home agent (HA) 112, a policy server 114, MIP mobile subscriber 116, and SIP mobile subscriber 118. As one practiced in the field would appreciate, network 100 can include other devices such as application servers, base stations, and packet control functions. Additionally, other communication protocols can be used such as session initiation protocol. Session initiation protocol may be implemented with Diameter based messaging in some embodiments. PDSN 110 can provide service to SIP mobile subscriber 118 through a simple internet protocol (SIP) session 120. For SIP session 120 PDSN 110 can serve as the policy enforcement point for policy server 114. Service is provided to MIP mobile subscriber 116 by PDSN 110 or HA 112 because a mobile internet protocol (MIP) session 122 spans both devices. In certain embodiments of the invention, various aspects of the traffic flow from many sessions may be handled between the two devices.

PDSN 110 can communicate with policy server 114 using PULL model messaging 124. PULL model messaging 124 can include an access-request from PDSN 110 and an access-accept or an access reject from policy server 114. An access-accept message can be sent in response to an access-request message and includes at least one policy that defines enforcement actions. Alternatively, an access-reject message is sent in response to an access-request message when the access-request message cannot be successfully processed. For example, this can be due to a message authenticator attribute not being present, so the message does not pass verification. In some embodiments, when a policy enforcement point receives a access-reject message, the policy enforcement point terminates the subscriber session or the traffic flow. If the access-reject is for a particular traffic flow, that particular traffic flow may be terminated leaving other traffic flows associated with the same subscriber session intact.

Communication between HA 112 and policy server 114 can occur through PULL model messaging 126. PULL model messaging 126 can include similar messages as described between PDSN 110 and policy server 114. Some messaging attributes included in the PULL model messages may differ when different policy enforcement points or different protocols are used. For example, different ID attributes may be used for a Gateway General packet radio service Serving Node (GGSN) implementation. Additionally, some protocols are identified with different parameters and so the parameters provided a policy enforcement point may need to change depending on the protocol.

Policy server 114 can communicate with PDSN 110 using PUSH model messaging 128. PUSH model messaging 128 can include a change-of-authorization (COA) message and a disconnect-message from policy server 114 and acknowledgement (Ack) or negative acknowledgement (Nak) from PDSN 110 in response to the unsolicited messages from policy server 114. A disconnect-message can be used by policy server 114 to terminate one or more ongoing subscriber sessions or traffic flows through PDSN 110 in an unsolicited fashion. The Ack and Nak messages sent by PDSN 110 can be in response to a COA message or a disconnect-message from policy server 114. An Ack message indicates that PDSN 110 successfully implemented the request of policy server 114, while a Nak indicates that PDSN 110 encountered errors when attempting to implement the request.

HA 112 and policy server 114 can communicate through PUSH model messaging 130. PUSH model messaging 130 can include similar messages as described between PDSN 110 and policy server 114, although message attributes may differ for other protocols and policy enforcement points. Table 1 below illustrates attributes that can be included in a COA message and Table 2 illustrates the attributes in a disconnect-message. The notation in this table and tables hereinafter can be understood to mean the following: "0-1" means the attribute can be either present or not present (optional), "0" means not included, "0+" means may not be included, or may be include one or more times, and "1" means included one time.

TABLE 1

Change-of-Authorization Message Attributes

| Attribute | COA Request | COA ACK | COA NAK |
|---|---|---|---|
| User-Name | 0-1 | 0 | 0 |
| NAS-IP-Address | 0-1 | 0 | 0 |
| Service-Type | 0-1 | 0 | 0 |
| Framed-IP-Address | 0-1 | 0 | 0 |
| Filter-Id | 1 | 0 | 0 |
| Calling-Station-Id | 0-1 | 0 | 0 |
| NAS-Identifier | 1 | 0 | 0 |
| State | 0-1 | 0-1 | 0-1 |

TABLE 1-continued

Change-of-Authorization Message Attributes

| Attribute | COA Request | COA ACK | COA NAK |
|---|---|---|---|
| Proxy-State | 0+ | 0+ | 0+ |
| Acct-Session-Id | 0-1 | 0 | 0 |
| Event-Timestamp | 0-1 | 0-1 | 0-1 |
| 3GPP2-Correlation-Id | 0-1 | 0 | 0 |
| 3GPP-IMSI | 0-1 | 0 | 0 |
| 3GPP-NSAPI | 0-1 | 0 | 0 |
| Error-Cause | 0 | 0+ | 1 |
| SN1-IP-In-ACL | 0+ | 0 | 0 |
| SN1-IP-Out-ACL | 0+ | 0 | 0 |

TABLE 2

Disconnect Message Attributes

| Attribute | DM Request | DM ACK | DM NAK |
|---|---|---|---|
| User-Name | 0-1 | 0 | 0 |
| NAS-IP-Address | 0-1 | 0 | 0 |
| Service-Type | 0-1 | 0 | 0 |
| Framed-IP-Address | 0-1 | 0 | 0 |
| Calling-Station-Id | 0-1 | 0 | 0 |
| NAS-Identifier | 1 | 0 | 0 |
| State | 0-1 | 0-1 | 0-1 |
| Proxy-State | 0+ | 0+ | 0+ |
| Acct-Session-Id | 0-1 | 0 | 0 |
| Acct-Terminate-Cause | 0 | 1 | 0 |
| Event-Timestamp | 0-1 | 0-1 | 0-1 |
| 3GPP2-Correlation-Id | 0-1 | 0 | 0 |
| 3GPP2-Disconnect-Reason | 0-1 | 0 | 0 |
| 3GPP-IMSI | 0-1 | 0 | 0 |
| 3GPP-NSAPI | 0-1 | 0 | 0 |
| Error-Cause | 0 | 0+ | 1 |

As illustrated above in Table 1, the attributes included in a COA message can vary. The variance can depend on the protocol (e.g, Mobile IP, Simple IP) and the policy enforcement point (e.g., a home agent, a packet data serving node) used. A number of the attributes listed in Table 1 are for purposes of identifying the subscriber session and the traffic flow. Some attributes that can be used for identification are: user-name (network access identifier), NAS-IP-Address, Framed-IP-Address, Framed-Interface-Id, Framed-IPv6-Prefix, Calling-Station-ID (mobile subscriber identification), 3GPP2-Correlation-ID, and 3GPP-IMSI/3GPP-NSAPI (for Gateway General packet radio service Serving Node (GGSN) policy enforcement points). Other attributes that may be used for identification purposes are FowID (evolution data only (EVDO)-rev-A) and SRID (A10 identifier).

The attributes relating to service-type, NAS-Identifier, NAS-IP-Address, state, and proxy-state, are based on attributes of RADIUS messages in some embodiments. The NAS-Identifier can be used to identify the policy enforcement point or a group of policy enforcement points to distinguish where the request is coming from. The NAS-Identifier can be used to identify other entities as well, such as contexts running on the policy enforcement point. The state and proxy-state are attributes that are passed from a radius server (not shown) or a policy server to the policy enforcement point in an authentication access message. The state and proxy-state are attributes can be included in subsequent messages to the policy server or radius server (not shown). The Acct-Session-Id, Event-Timestamp, and Acct-Terminate-Cause attributes relate to accounting information that can be stored and tracked on the policy server. The Acct-Session-Id is used to identify an accounting session, which begins with an accounting-start message and ends with an accounting stop message. The event-timestamp records when an event occurred such as when accounting session starts. The Acct-Terminate-Cause can give a reason for an accounting stop message.

The service-type attribute is used to indicate the type of service the user has requested, or the type of service to be provided. In some embodiments of the invention, an authenticate only service-type is used and so no authorization information needs to be returned in the access-accept message. Other service types can also be used. The attributes of Filter-Id, SN1-IP-In-ACL, and SN1-IP-Out-ACL are used for applying, removing, and enforcing policies at the policy enforcement point in certain embodiments of the invention.

A COA message can communicate policies and policy modifications in several ways. A first way of removing a policy from a policy enforcement point is for the policy server to send a COA message with an empty Filter-ID attribute. The empty Filter-ID value is defined in the policy enforcement point and can be specified as a "0" or a non-zero value to indicated an empty Filter-ID. A second way of removing a policy from a policy enforcement point is to send a COA message with no SN1-IP-In-ACL and SN1-IP-Out-ACL attributes. A third way of removing a policy is to use a COA message with a special vendor specific attribute (VSA), which when present would prompt the policy enforcement point to remove the existing policy rules.

In some embodiments of the invention, a policy enforcement point uses an access control list to enforce policies. An access control list can be used to control access to ports and services that are available on a policy enforcement point. The access control list can be used to control both inbound and outbound traffic, and may be similar to a firewall or packet filter in some embodiments. In some embodiments of the invention, policies can be configured as access control lists in the policy enforcement point. A COA message can communicate which of the policies from the local access control list to apply to a subscriber session or traffic flow by including a reference in the COA message to the policy in the access control list. The reference can be included in the COA message as a Filter-ID attribute. In other embodiments of the invention, SN1-IP-In-ACL and SN1-IP-Out-ACL attributes can be used to pass policies to the policy enforcement point. These policies can be dynamic policies provided by the policy server. This permits the policy server to develop policies according to the situation and not be constrained to use a preset list of policies. An example of an SN1-IP-In-ACL or SN1-IP-Out-ACL attribute can be:

Attribute Type: 26 <1 byte>
Attribute Length: <length><1 byte>
Vendor-ID: 8164 <4 bytes>
Type: 17 <1 byte>
Length: <length of string including Type and Length><1 byte>
Value: <string of max 246 bytes>

The SN1-IP-In-ACL attribute can carry policy rules to an access control list that is used to apply policy rules for traffic from the subscriber. The SN1-IP-Out-ACL can carry policy rules to an access control list that is used to apply policy rules for the traffic directed towards the subscriber. In some embodiments, variations upon the SN1 format shown above for SN1-IP-In-ACL can be used, such as using 2 bytes for the type and length. Other variations are denoted with the prefix "SN."

Figure 2:
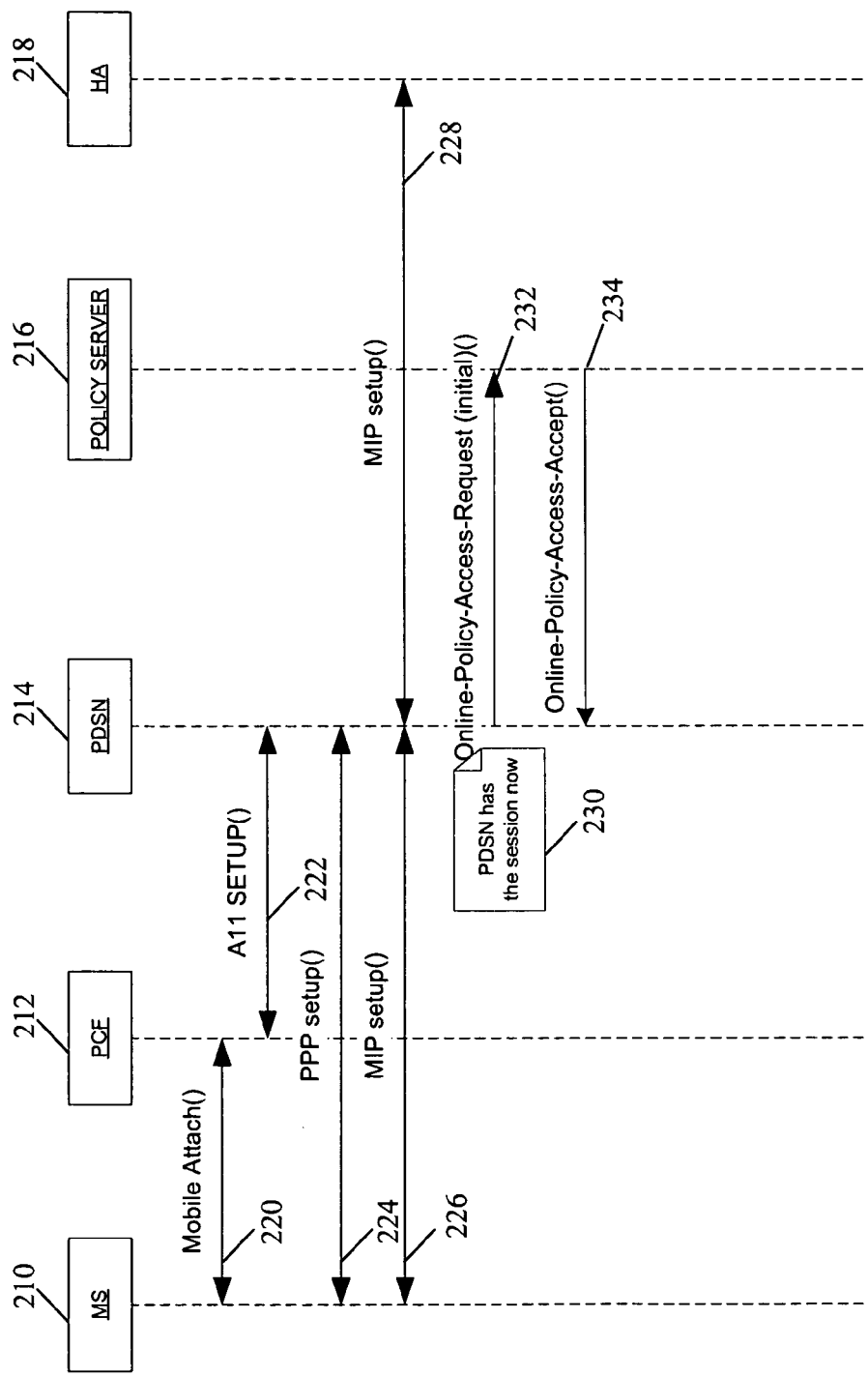
FIG. 2 is a schematic signaling diagram of a subscriber session setup in accordance with certain embodiments of the invention.

FIG. 2 is a schematic signaling diagram of a subscriber session setup 200 in accordance with certain embodiments of the invention. Subscriber session setup 200 includes a mobile subscriber (MS) 210, a packet control function (PCF) 212, a packet data serving node (PDSN) 214, a policy server 216, and a home agent (HA) 218. PDSN 214 serves as a policy enforcement point in FIG. 2. Illustrated mobile subscriber 210 begins a subscriber session setup by sending a setup message to PCF 212. Mobile attach messaging 220 can be used to initiate a subscriber session. PCF 212 communicates with PDSN 214 through A11 setup messaging 222 to setup a communication link. Point-to-point protocol (PPP) setup messaging 224 is used to establish as connection between MS 210 and PDSN 214. MIP setup messaging 226 and MIP setup messaging 228 are used to provide a connection from MS 210 to HA 218. The subscriber session can flow through PDSN 214 so that PDSN 214 can serve as a policy enforcement point to session 230. PDSN 214 sends an online-policy-access-request message 232 to policy server 216 to establish a corresponding subscriber session in policy server 216. Policy server 216 can authenticate online-policy-access-request message 232 and use the identification information sent in the message to establish the subscriber session. Policy server 216 sends an online-policy-access-accept message 234 to PDSN 214. Access-accept message 234 can acknowledge the subscriber session establishment and may specify one or more policies that govern the subscriber session.

Figure 3:
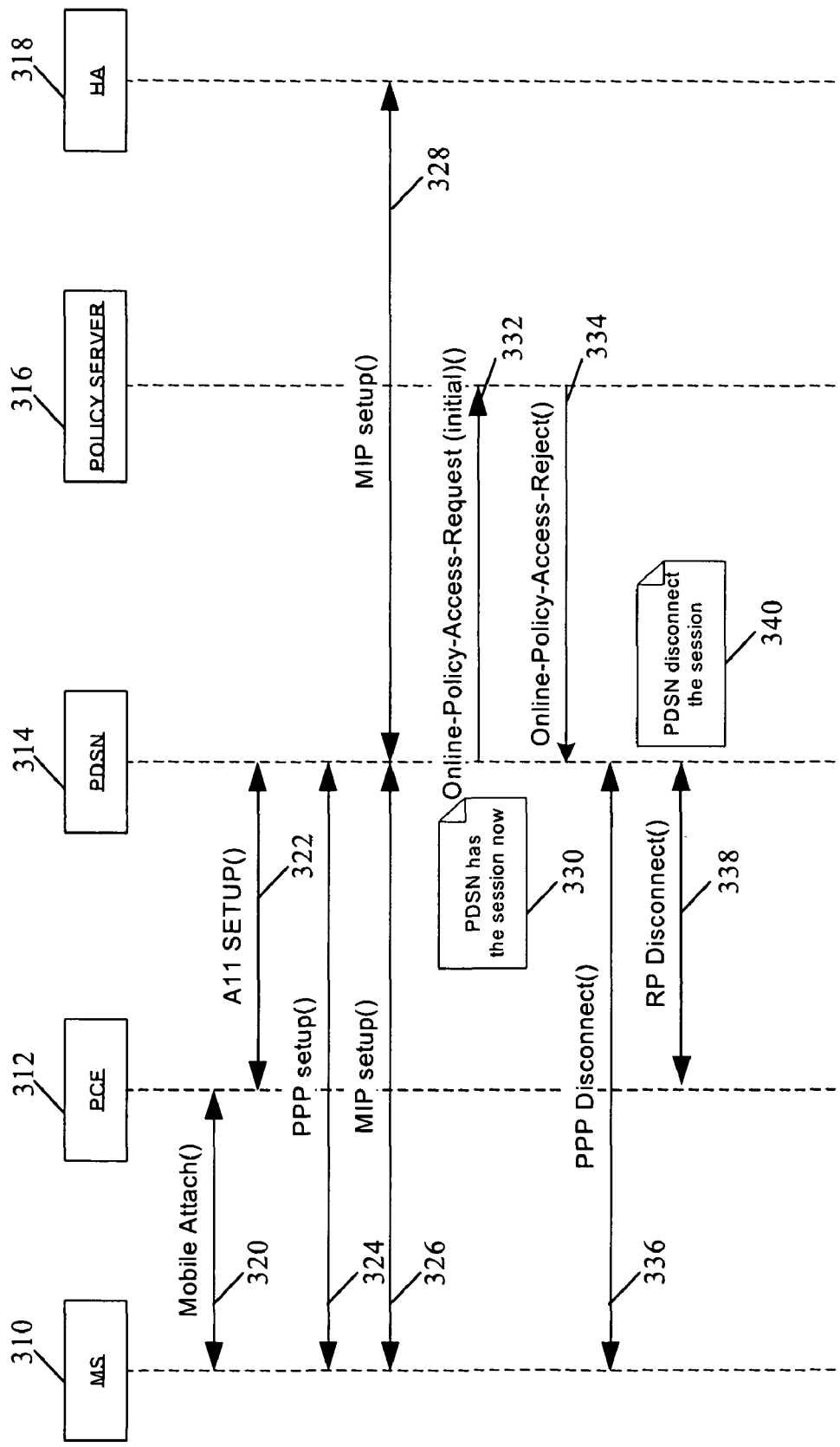
FIG. 3 is a schematic signaling diagram of a rejected subscriber session setup in accordance with certain embodiments of the invention.

FIG. 3 is a schematic signaling diagram of a rejected subscriber session setup 300 in accordance with certain embodiments of the invention. Subscriber session setup 300 includes a mobile subscriber (MS) 310, a packet control function (PCF) 312, a packet data serving node (PDSN) 314 (serving as a policy enforcement point), a policy server 316, and a home agent (HA) 318. The initial signaling to setup a subscriber session in FIG. 3 is similar to FIG. 2 with mobile attach messaging 320, A11 setup messaging 322, PPP setup messaging 324, and MIP setup messaging 326 and 328. With the establishment of MIP setup messaging 326 and 328, PDSN 314 can be a policy enforcement point to subscriber session 330. An online-policy-access-request message 332 is sent from PDSN 314 to policy server 316. Policy server 316 can receive online-policy-access-request message 332 and if it has problems authenticating the message or establishing a corresponding subscriber session, for example, a corresponding subscriber session is not established. Policy server 316 informs PDSN 314 of the establishment failure by sending an online-policy-access-reject message 334. PDSN 314 messages MS 310 to disconnect PPP link 336 and radio protocol (RP) 338. PDSN 314 disconnects the subscriber session 340.

Figure 4:
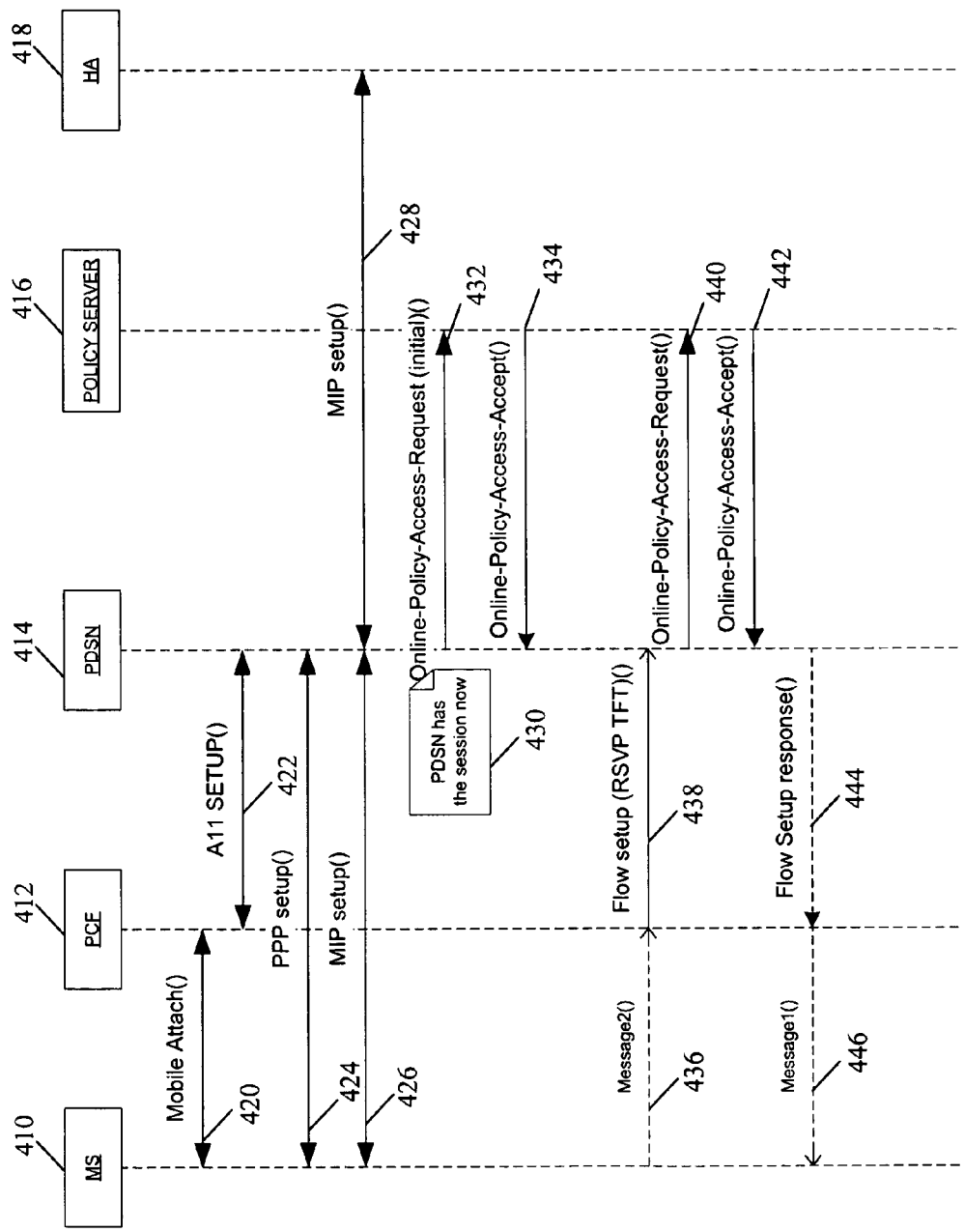
FIG. 4 is a schematic signaling diagram of a flow setup in accordance with certain embodiments of the invention.

FIG. 4 is a schematic signaling diagram of a flow setup 400 in accordance with certain embodiments of the invention. Flow setup 400 includes a mobile subscriber (MS) 410, a packet control function (PCF) 412, a packet data serving node (PDSN) 414 (serving as a policy enforcement point), a policy server 416, and a home agent (HA) 418. Flow setup 400 begins with signaling to setup a subscriber session in PDSN 414 and a corresponding subscriber session in policy server 416. The subscriber setup includes mobile attach 420, A11 setup 422, PPP setup 424, MIP setup 426 and 428, session establishment 430, online-policy-access-request 432, and online-policy-access-accept 434.

A traffic flow can be requested by MS 410 by sending a message. Message2 436 is sent from MS 410 to PCF 412 to initiate a traffic flow. PCF 412 sends a flow setup message 438 to PDSN 414. Flow setup message 438 includes a resource reservation protocol (RSVP) and a traffic flow template (TFT). PDSN 414 can setup a traffic flow by sending an online-access-request 440 to policy server 416. Online-access-request message 440 can include flow information, which is used by policy server 416 to determine policy rules to govern the traffic flow. Policy rule information is sent from policy server 416 to PDSN 414 in online-policy-access-accept message 442. PDSN 414 then can setup the request traffic flow upon receipt of online-policy-access-accept message 442. A flow setup response message 444 is sent from PDSN 414 to PCF 412. Flow setup response message 444 can include information regarding the established traffic flow and can indicate a successful flow establishment. PCF 412 sends a message1 446 to relay the received information to MS 410.

Figure 5:
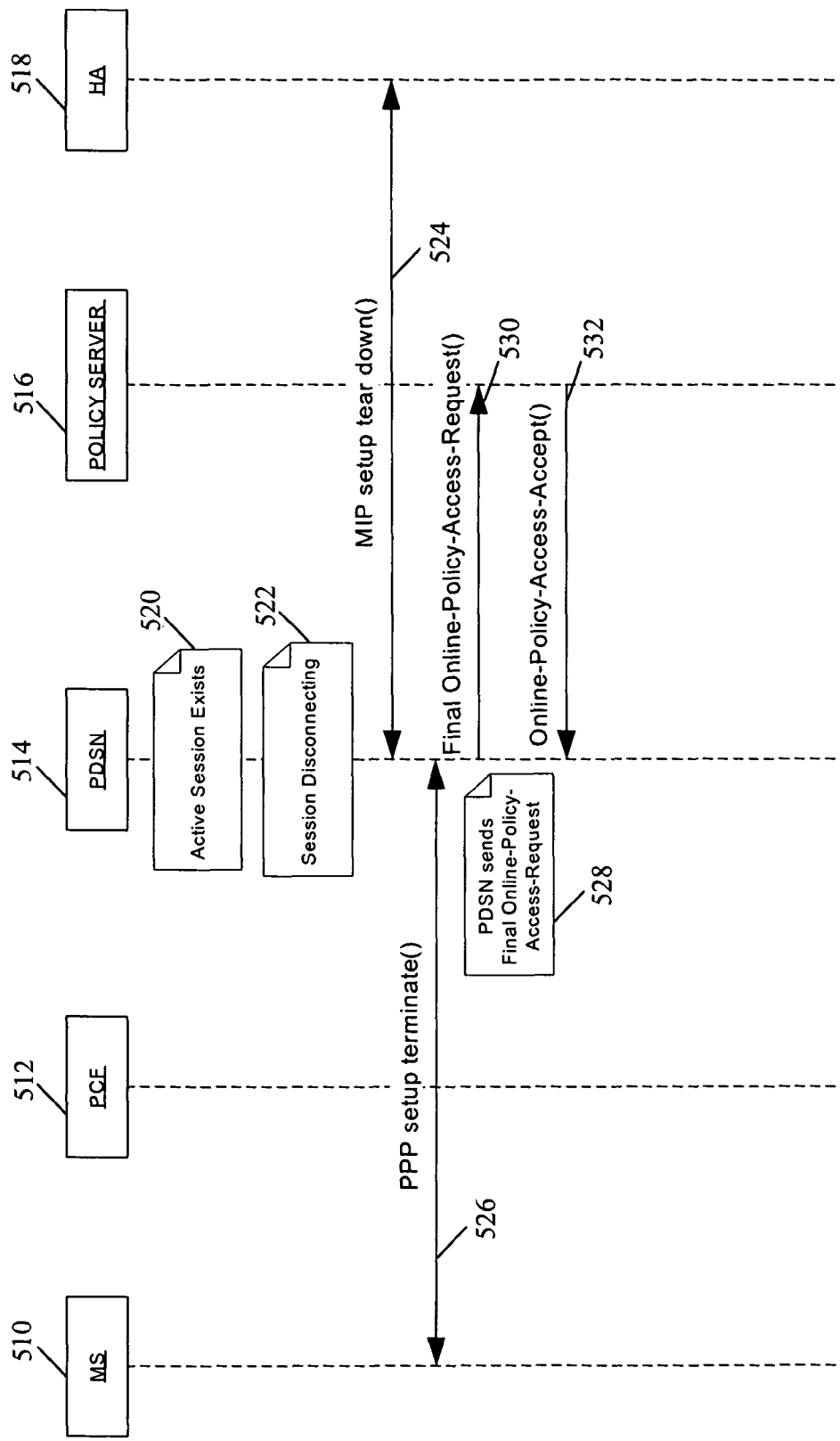
FIG. 5 is a schematic signaling diagram of subscriber session disconnect in accordance with certain embodiments of the invention.

FIG. 5 is a schematic signaling diagram of subscriber session disconnect 500 in accordance with certain embodiments of the invention. Subscriber session disconnect 500 includes a mobile subscriber (MS) 510, a packet control function (PCF) 512, a packet data serving node (PDSN) 514 (serving as a policy enforcement point), a policy server 516, and a home agent (HA) 518. An active subscriber session 520 exists on PDSN 514 until a subscriber session disconnect 522 occurs. Illustrated subscriber session disconnect 522 can occur due to an inactivity time out, due to a hardware or software failure, or due to a disconnect message received from MS 510. PDSN 514 initiates MIP connection teardown messaging 524 with HA 518 as well as PPP link termination messaging 526 with MS 510. PDSN 514 notifies policy server 516 of the session disconnect 522 by sending a final online-policy-access-request message 528. Illustrated final online-policy-access-request message 530 can provide policy server 516 with information regarding which subscriber session is being disconnected so that policy server 516 can remove the corresponding subscriber session. Policy server 516 sends an online-policy-access-accept message 532 if the subscriber session is successfully removed. An online-policy-access-reject message (not shown) may be sent if an error occurs when removing the subscriber session.

Figure 6:
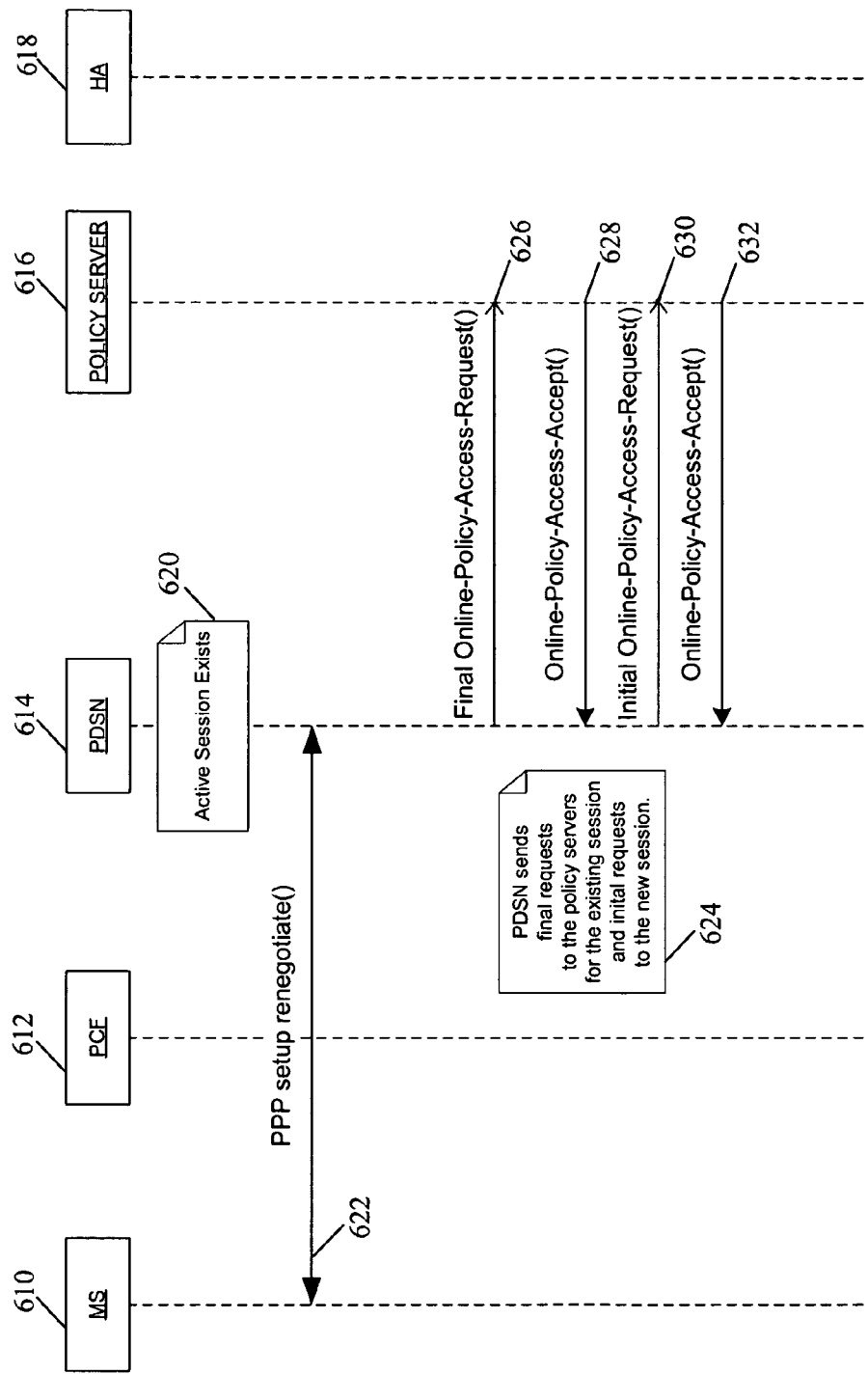
FIG. 6 is a schematic signaling diagram of a point-to-point renegotiation in accordance with certain embodiments of the invention.

FIG. 6 is a schematic signaling diagram of a point-to-point protocol (PPP) renegotiation 600 in accordance with certain embodiments of the invention. PPP renegotiation 600 includes a mobile subscriber (MS) 610, a packet control function (PCF) 612, a packet data serving node (PDSN) 614 (serving as a policy enforcement point), a policy server 616, and a home agent (HA) 618. An active subscriber session 620 exists on PDSN 614 when a point-to-point protocol (PPP) link between PDSN 614 and MS 610 is renegotiated. The PPP link can be renegotiated because of a handoff, such as a PCF to PCF handoff or a PDSN to PDSN handoff. When a PPP link is going to be renegotiated, PPP setup renegotiate messaging 622 is initiated. The messaging can be initiated after a handoff is detected by PDSN 614. As part of the PPP renegotiation PDSN 614 sends final request messaging to the policy server 616 for the existing subscriber session and initial request messaging for a new subscriber session 624. A final online-policy-access-request message 626 is sent to policy server 616 to terminate the subscriber session. An online-policy-access-accept message 628 is sent from policy server 616 to confirm that the subscriber session is terminated. PDSN 614 sends an initial online-policy-access-request message 630 to establish a new subscriber session associated with the renegotiated PPP link. Policy server 616 sets up the subscriber session and sends PDSN 614 an online-policy-access-accept message 632 indicating that the subscriber session was successfully established.

Figure 7:
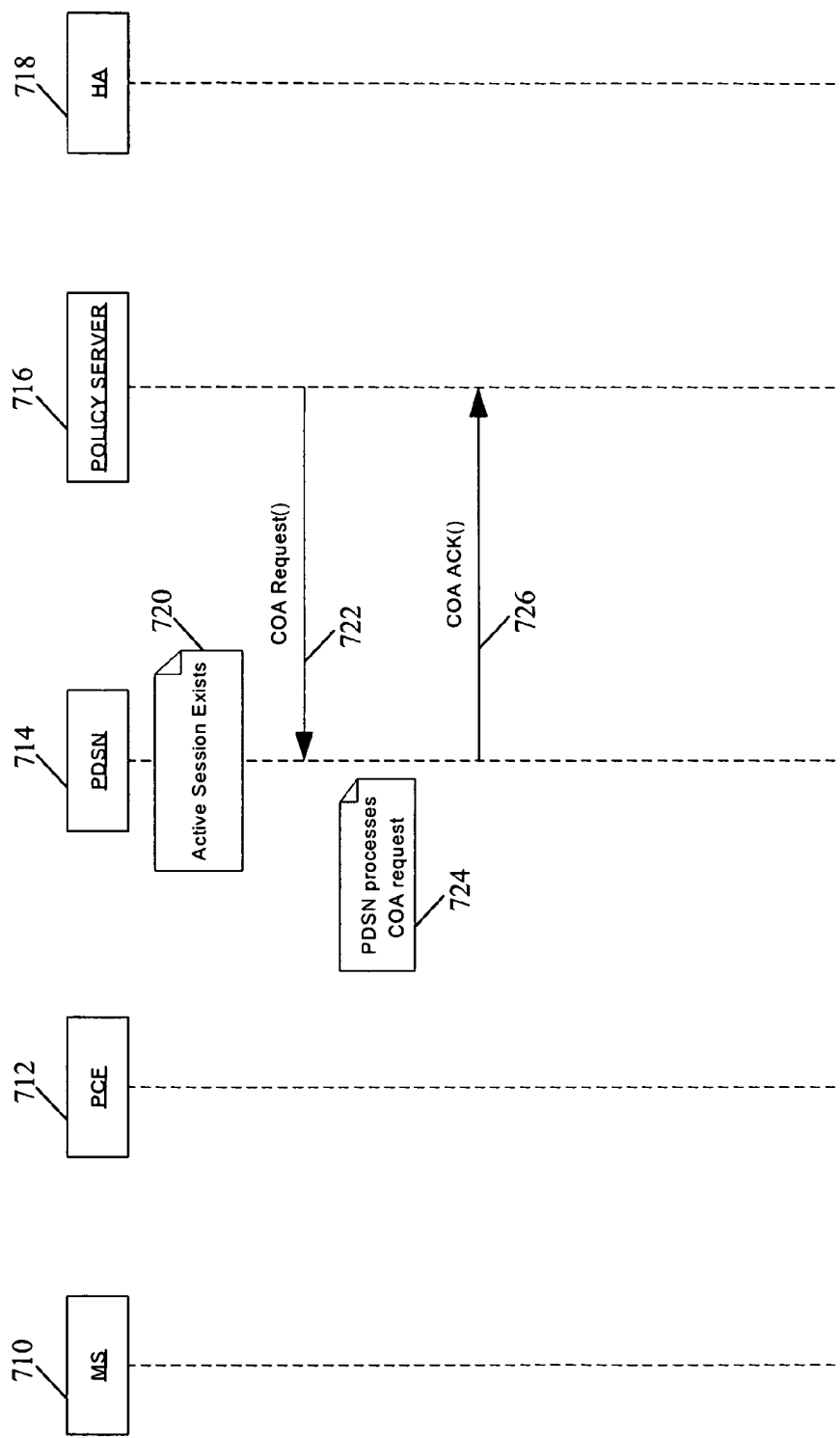
FIG. 7 is a schematic signaling diagram of a policy application in accordance with certain embodiments of the invention.

FIG. 7 is a schematic signaling diagram of a policy application 700 in accordance with certain embodiments of the invention. Policy application 700 includes a mobile subscriber (MS) 710, a packet control function (PCF) 712, a packet data serving node (PDSN) 714 (serving as a policy enforcement point), a policy server 716, and a home agent (HA) 718. An active subscriber session 720 exists on PDSN 714 when policy server 716 sends an unsolicited Change-of-Authorize (COA) request message 722, which is used by policy server 716 to apply or remove unsolicited policies in PDSN 714. PDSN 714 processes the COA request 724, which can involve removing or modifying existing policies in addition to applying new policies. A COA Ack message 726 is sent from PDSN 714 to policy server 716 to acknowledge a successful processing of COA request 722.

Figure 8:
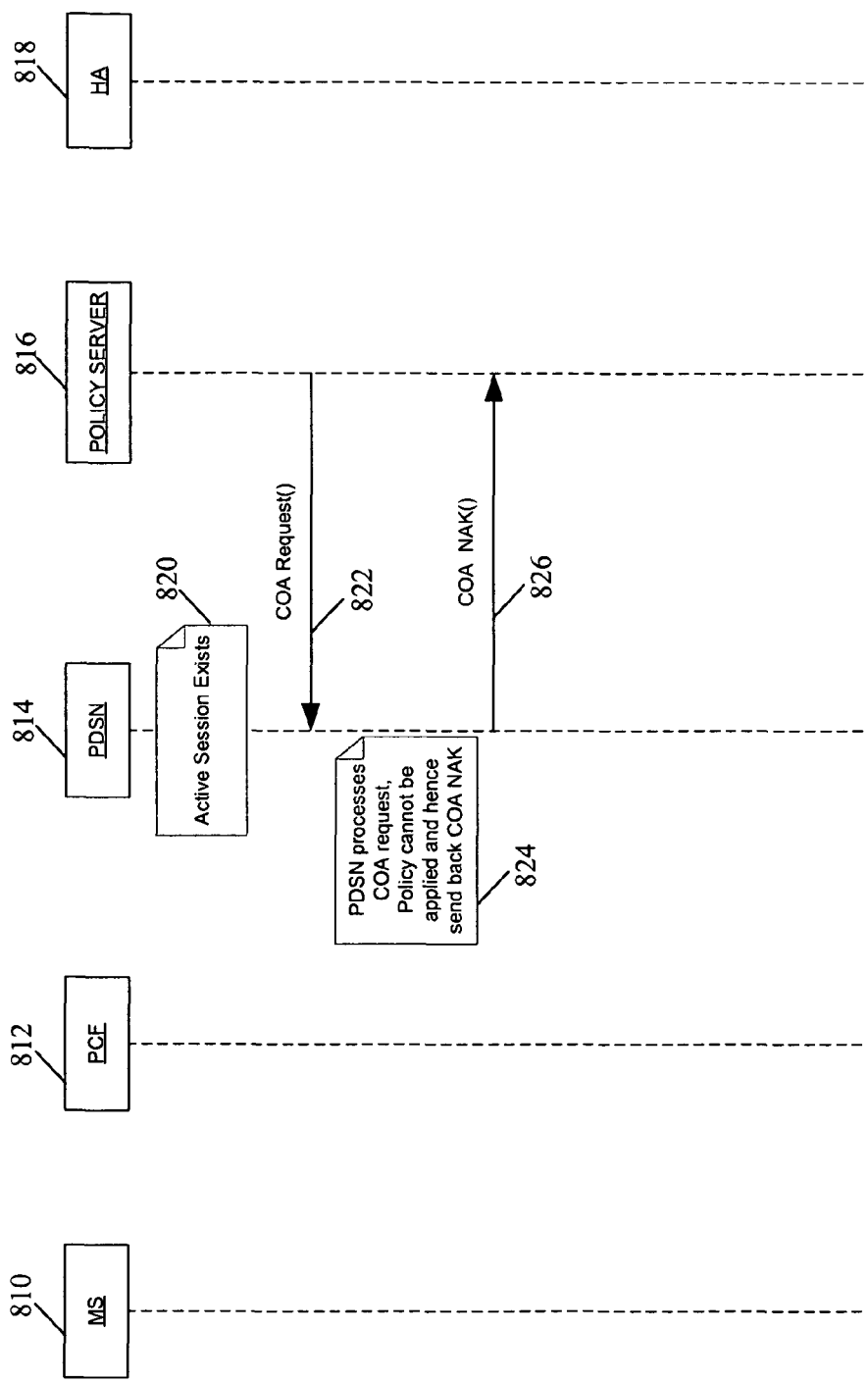
FIG. 8 is a schematic signaling diagram of a policy error response in accordance with certain embodiments of the invention.

FIG. 8 is a schematic signaling diagram of a policy error response 800 in accordance with certain embodiments of the invention. Policy error response 800 includes a mobile subscriber (MS) 810, a packet control function (PCF) 812, a packet data serving node (PDSN) 814 (serving as a policy enforcement point), a policy server 816, and a home agent (HA) 818. An active subscriber session 820 exists on PDSN 814 when a COA request message 822 is received by PDSN 814 from policy server 816. PDSN 814 processes COA request message 822, but the policy cannot be applied 824. A COA Nak message 826 is sent to inform policy server 816 of the failure 824. The failure can arise from a failure to authenticate the COA message, to add a policy, to remove a policy, or to modify a policy in PDSN 814.

Figure 9:
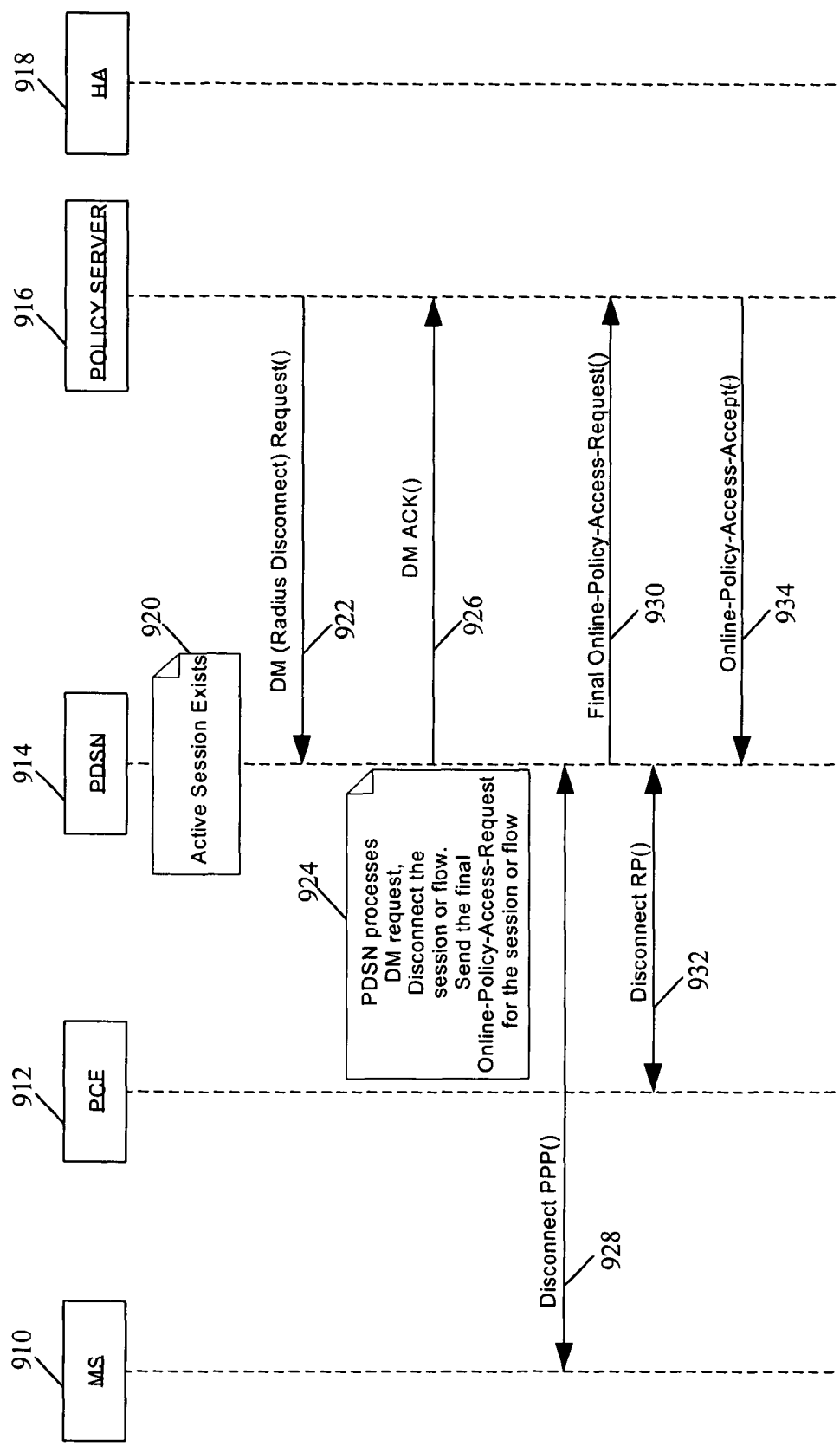
FIG. 9 is a schematic signaling diagram of a policy server disconnect in accordance with certain embodiments of the invention.

FIG. 9 is a schematic signaling diagram of a policy server disconnect 900 in accordance with certain embodiments of the invention. Policy server disconnect 900 includes a mobile subscriber (MS) 910, a packet control function (PCF) 912, a packet data serving node (PDSN) 914 (serving as a policy enforcement point), a policy server 916, and a home agent (HA) 918. An active subscriber session 920 exists on PDSN 914 when policy server 916 sends a disconnect message (DM) request 922 to PDSN 914. PDSN 914 processes DM request 922 and disconnects the subscriber session or associated traffic flow 924. A DM Ack message 926 is sent from PDSN 914 to policy server 916 to acknowledge that the disconnection of the subscriber session or traffic flow has begun. PDSN 914 initiates disconnect PPP messaging 928 with MS 910. A final online-policy-access-request 930 is sent from PDSN 914 to policy server 916 to remove the corresponding subscriber session or traffic flow from policy server 916. PDSN 914 initiates disconnect RP messaging 932. Policy server 916 sends an online-policy access-accept message 934 to indicate to PDSN 914 that the subscriber session or traffic flow was removed from the policy server.

Figure 10:
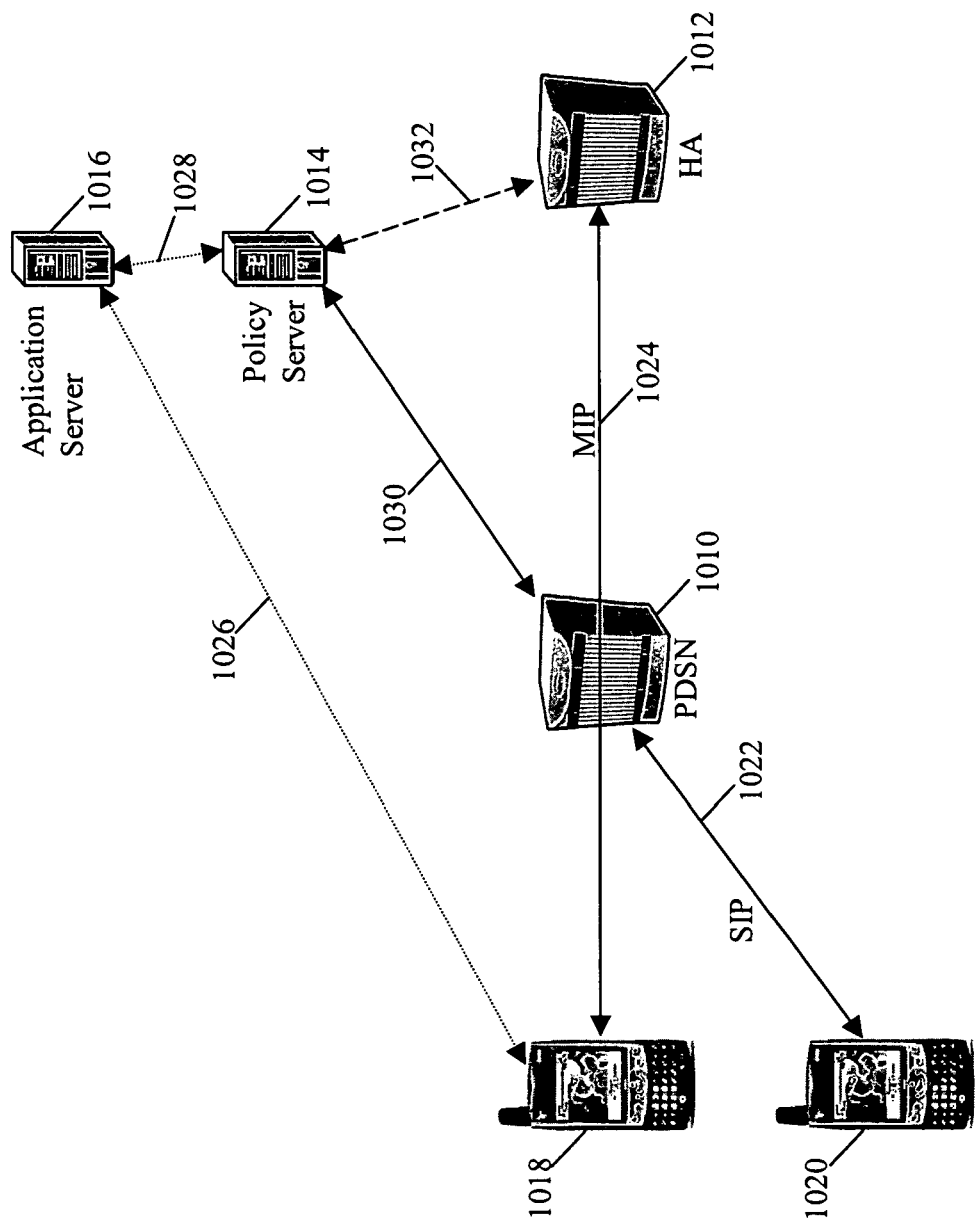
FIG. 10 is a schematic diagram of a network using a policy interface in conjunction with an application server in accordance with certain embodiments of the invention.

FIG. 10 is a schematic diagram of a network 1000 using a policy interface in conjunction with an application server in accordance with certain embodiments of the invention. Network 1000 includes a packet data serving node (PDSN) 1010, a home agent (HA) 1012, a policy server 1014, an application server 1016, a mobile internet protocol (MIP) mobile subscriber (MS) 1018, and simple internet protocol (SIP) mobile subscriber (MS) 1020. Illustrated application server 1016 is a server computer in network 1000 that can provide various software applications such as email, streaming media, music download applications, and multiplayer games. In some embodiments, application server 1016 is a session initiation protocol application server for voice over IP (VOIP) applications. Policy server 1014 is a server computer that communicates with application server 1016, PDSN 1018, and possibly HA 1012, to determine how traffic flow should be managed on network 1000. PDSN 1018 can serve to enforce the decisions made by policy server 1014 as a policy enforcement point.

In some embodiments, a mobile subscriber communicates with network 1000 in a session that is setup with a protocol such as Simple IP 1022 or Mobile IP 1024. If a Simple IP session 1022 is setup by mobile subscriber 1020, the policy enforcement can occur at the PDSN 1010 from policies pushed or pulled down by policy server 1014. Alternatively, for a Mobile IP session 1024, the mobile device 1018 may set up a connection with both PDSN 1010 and HA 1012. With a Mobile IP session 1024, enforcement can be handled at PDSN 1010 or HA 1012 because the session spans both devices. In certain embodiments of the invention, various aspects of the traffic flow from many sessions may be handled between the two devices. For example, PDSN 1010 handles QoS for VOIP applications and the HA 1012 handles QoS for streaming video. While PDSN 1010 and HA 1012 may not work together, policy server 1014 can coordinate each device through instructions to establish desired operating conditions. In addition, in some embodiments, PDSN 1010 can support multiple protocols, such as simple IP 1022 and mobile IP 1024, at the same time.

Following a session setup with a protocol 1024, MIP mobile subscriber 1018 can start running the client applications. To initiate applications, MIP mobile subscriber 1018 communicates information 1026 with application server 1016. Illustrated application server 1016 contacts policy server 1014 with subscriber session or traffic flow message information 1028. Subscriber session or traffic flow message information 1028 can include an IP address/Port number of MIP mobile subscriber 1018, correspondent nodes IP address/Port number (such as application server 1016 IP address/Port number), protocol (MIP 1024), and other types of information such as charging information or QoS requirements. From subscriber session or traffic flow message information 1028 and other information (e.g., information stored locally), policy server 1014 can identify PDSN 1010 for policy enforcement. Policy server 1014 sends PDSN 1010 QoS policy information through a Change-of-Authorization (COA) message 1030. In some embodiments, policy server 1014 sends HA 1012 a COA message 1032. The COA message can be a Radius based message. Illustrated COA message 1030 contains identification attributes for identifying the subscriber session in PDSN 1010. Mobile IP address (Framed-IP-Address) and NAS-IP-Address are some types of information that may be used as the identification parameters. In certain embodiments, other messages or identification parameters may be used as was explained above.

QoS policies are applied to the traffic flows in network 1000. In some embodiments, the QoS policies can be applied to the subscriber session or to a specific flow. If the QoS policies are going to be applied to a subscriber session the parameters may be the Radius attributes currently supported for traffic policing. FIG. 10 illustrates certain embodiments where a mobile subscriber initiates an application and policy server 1014 sends unsolicited Change-of-Authorization message to a policy enforcement point such as PDSN 1010 or HA 1012.

In certain embodiments of the invention, the policy interface is used to implement QoS and this can be further explained with reference back to FIGS. 7, 8, and 9. In FIG. 7 PDSN 714 is supporting an active session 720. This active session 720 can be a SIP or MIP session (or any other applicable protocol) initiated by mobile subscriber 710. Illustrated policy server 716 sends a COA request 722 to PDSN 714. COA request 722 can include one or more of the following: a framed-IP-address, a network access server (NAS)-IP-Address, an Event-Time-Stamp, and QoS traffic policy attributes. The framed-IP-address and the NAS-IP-Address can be used to identify the active session. The QoS traffic policy attributes can be used to apply policies to the active session, which are enforced by PDSN 714. A COA acknowledgment (Ack) 726 is sent to policy server 716 to indicate a successful application of the policies to the active session. Alternatively, a COA negative-acknowledgement (Nak) 826 (FIG. 8) may be used to indicate a policy cannot be implemented to the active session by the PDSN 814.

As shown in FIG. 9, an active session 920 exists on the PDSN 914. Illustrated policy server 916 sends a disconnect message 922 that can include a framed-IP-Address, a NAS-IP-Address, and/or an Event-Time-Stamp. The session is then disconnected 924 from the PDSN 914 and a disconnect Ack 926 is sent to policy server 916. Alternatively, if the session is not disconnected a disconnect Nak (not shown) is sent to policy server 916.

The COA message, as applied to QoS, uses additional attributes in some embodiments of the invention. The notation in the example below can be understood to mean the following: "VSA" is a vendor specific attribute, "length" is the number of bytes used for the attribute, "type: 26" is a VSA message, and "Vendor ID" can be used to distinguish the specific vendor to which message corresponds (e.g., Starent Networks Corporation). Examples of such attributes are provided below:

The policy server may have various attributes or properties in accordance with certain embodiments of the present invention. The policy server sends a COA message to apply QoS policies. The policy server sends another COA message with updated values when QoS Policies are updated/changed/removed. A detailed trace of a COA request, a COA Nak, and a COA Ack in accordance with some embodiments is given below as an example:

---

COA Request
RADIUS COA Rx PDU, from 192.20.20.1:1645 to 192.20.20.2:3799 (38)
PDU-dict=starent-vsa1
    Code: 43 (Change-of-Authorize-Request)
    Id: 3
    Length: 38
    Authenticator: 32 ED 74 4D E7 E2 C7 55 22 2F 6C 4D 91 D1 F8 18
        Framed-IP-Address = 172.20.20.2
        NAS-IP-Address = 192.20.20.2
        Event-Timestamp = 1130951518
    SN1-QoS-Tp-Dnlk = Enabled
        SN1-Tp-Dnlk-Committed-Data-Rate = 24000
        SN1-Tp-Dnlk-Peak-Data-Rate = 28000

---

TABLE 3

QoS specific attributes

| Attribute Name | Type | Vendor ID | VSA Type | Length | Value |
|---|---|---|---|---|---|
| SN-QoS-Tp-Dnlk (or SN1-QoS-Tp-Dnlk) | 26 | 8164 | 72 | 4 | Enumerations for enable/disable traffic policing in downlink direction are<br>Enable = 0,<br>Disable = 1, |
| SN-Tp-Dnlk-Committed-Data-Rate (or SN1-Tp-Dnlk-Committed-Data-Rate) | 26 | 8164 | 73 | 4 | An unsigned integer specifying the downlink committed-data-rate in bps |
| SN-Tp-Dnlk-Peak-Data-Rate (or SN1-Tp-Dnlk-Committed-Data-Rate) | 26 | 8164 | 74 | 4 | An unsigned integer specifying the peak-data-rate in bps |
| SN-Tp-Dnlk-Burst-Size (or SN1-Tp-Dnlk-Burst-Size) | 26 | 8164 | 75 | 4 | An unsigned integer specifying the downlink-burst-size in bytes |
| SN-Tp-Dnlk-Exceed-Action (or SN1-Tp-Dnlk-Exceed-Action) | 26 | 8164 | 76 | 4 | Enumerations for the Action are<br>Transmit = 0,<br>Drop = 1,<br>Lower-Ip-Precedence = 2 |
| SN-Tp-Dnlk-Violate-Action (or SN1-Tp-Dnlk-Violate-Action) | 26 | 8164 | 77 | 4 | Enumerations for the Action are<br>Transmit = 0,<br>Drop = 1,<br>Lower-Ip-Precedence = 2 |
| SN-QoS-Tp-Uplk (or SN1-QoS-Tp-Uplk) | 26 | 8164 | 78 | 4 | Enumerations for enable/disable traffic policing in uplink direction are<br>Enable = 0,<br>Disable = 1, |
| SN-Tp-Uplk-Committed-Data-Rate (or SN1-Tp-Uplk-Committed-Data-Rate) | 26 | 8164 | 79 | 4 | An unsigned integer specifying the downlink committed-data-rate in bps |
| SN-Tp-Uplk-Peak-Data-Rate (or SN1-Tp-Uplk-Committed-Data-Rate) | 26 | 8164 | 80 | 4 | An unsigned integer specifying the peak-data-rate in bps |
| SN-Tp-Uplk-Burst-Size (or SN1-Tp-Uplk-Burst-Size) | 26 | 8164 | 81 | 4 | An unsigned integer specifying the downlink-burst-size in bytes |
| SN-Tp-Uplk-Exceed-Action (or SN1-Tp-Uplk-Exceed-Action) | 26 | 8164 | 82 | 4 | Enumerations for the Action are<br>Transmit = 0,<br>Drop = 1,<br>Lower-Ip-Precedence = 2 |
| SN-Tp-Uplk-Violate-Action (or SN1-Tp-Uplk-Violate-Action) | 26 | 8164 | 83 | 4 | Enumerations for the Action are<br>Transmit = 0,<br>Drop = 1,<br>Lower-Ip-Precedence = 2 |

```
        SN1-Tp-Dnlk-Burst-Size = 2400
        SN1-Tp-Dnlk-Exceed-Action = Lower-IP-Precedence
        SN1-Tp-Dnlk-Violate-Action = Drop
        SN1-QoS-Tp-Uplk = Enabled
        SN1-Tp-Uplk-Committed-Data-Rate = 24000
        SN1-Tp-Uplk-Peak-Data-Rate = 28000
        SN1-Tp-Uplk-Burst-Size = 2400
        SN1-Tp-Uplk-Exceed-Action = Transmit
        SN1-Tp-Uplk-Violate-Action = Lower-IP-Precedence
Detailed Trace below:
    Code: 43 (Change-of-Authorize-Request)
    Id: 4
    Length: 38
    Authenticator: F7 6A 71 A1 8C 14 4A 21 F9 DD 55 46 77 3A 00 28
        Attribute Type: 8 (Framed-IP-Address)
            Length: 6
            Value: AC 14 14 02                    ....
                (172.20.20.2)
        Attribute Type: 4 (NAS-IP-Address)
            Length: 6
            Value: C0 14 14 02                    ....
                (192.20.20.2)
        Attribute Type: 55 (Event-Timestamp)
            Length: 6
            Value: 43 68 F4 32                    Ch.2
                (1130951730)
Attribute Type: 26 (Vendor-Specific)
    Length: 12
    Vendor Id: 8164 (Starent)
    Vendor Type: 73 (SN1-QoS-Tp-Dnlk)
    Vendor Length: 6
    Value: 00 00 00 01                    ....
        (Enabled)
Attribute Type: 26 (Vendor-Specific)
    Length: 12
    Vendor Id: 8164 (Starent)
    Vendor Type: 74 (SN1-Tp-Dnlk-Committed-Data-Rate)
    Vendor Length: 6
    Value: 00 00 5D C0                    ..].
        (24000)
Attribute Type: 26 (Vendor-Specific)
    Length: 12
    Vendor Id: 8164 (Starent)
    Vendor Type: 75 (SN1-Tp-Dnlk-Peak-Data-Rate)
    Vendor Length: 6
    Value: 00 00 6D 60                    ..m'
        (28000)
Attribute Type: 26 (Vendor-Specific)
    Length: 12
    Vendor Id: 8164 (Starent)
    Vendor Type: 76 (SN1-Tp-Dnlk-Burst-Size)
    Vendor Length: 6
    Value: 00 00 09 60                    ...'
        (2400)
Attribute Type: 26 (Vendor-Specific)
    Length: 12
    Vendor Id: 8164 (Starent)
    Vendor Type: 77 (SN1-Tp-Dnlk-Exceed-Action)
    Vendor Length: 6
    Value: 00 00 00 02                    ....
        (Lower-IP-Precedence)
Attribute Type: 26 (Vendor-Specific)
    Length: 12
    Vendor Id: 8164 (Starent)
    Vendor Type: 78 (SN1-Tp-Dnlk-Violate-Action)
    Vendor Length: 6
    Value: 00 00 00 01                    ....
        (Drop)
Attribute Type: 26 (Vendor-Specific)
    Length: 12
    Vendor Id: 8164 (Starent)
    Vendor Type: 79 (SN1-QoS-Tp-Uplk)
    Vendor Length: 6
    Value: 00 00 00 01                    ....
        (Enabled)
Attribute Type: 26 (Vendor-Specific)
    Length: 12
    Vendor Id: 8164 (Starent)
    Vendor Type: 80 (SN1-Tp-Uplk-Committed-Data-Rate)
    Vendor Length: 6
    Value: 00 00 5D C0                    ..].
        (24000)
Attribute Type: 26 (Vendor-Specific)
    Length: 12
    Vendor Id: 8164 (Starent)
    Vendor Type: 81 (SN1-Tp-Uplk-Peak-Data-Rate)
    Vendor Length: 6
    Value: 00 00 6D 60                    ..m'
        (28000)
Attribute Type: 26 (Vendor-Specific)
    Length: 12
    Vendor Id: 8164 (Starent)
    Vendor Type: 82 (SN1-Tp-Uplk-Burst-Size)
    Vendor Length: 6
    Value: 00 00 09 60                    ...'
        (2400)
Attribute Type: 26 (Vendor-Specific)
    Length: 12
    Vendor Id: 8164 (Starent)
    Vendor Type: 83 (SN1-Tp-Uplk-Exceed-Action)
    Vendor Length: 6
    Value: 00 00 00 00                    ....
        (Transmit)
Attribute Type: 26 (Vendor-Specific)
    Length: 12
    Vendor Id: 8164 (Starent)
    Vendor Type: 84 (SN1-Tp-Uplk-Violate-Action)
    Vendor Length: 6
    Value: 00 00 00 02                    ....
        (Lower-IP-Precedence)
COA Nak
RADIUS COA Tx PDU, from 192.20.20.2:3799 to 192.20.20.1:1645 (32)
PDU-dict=starent-vsa1
    Code: 45 (Change-of-Authorize-Nak)
    Id: 3
    Length: 32
    Authenticator: 41 20 3C B7 26 DC BE E7 E7 A0 01 CA 57 53 10 94
        Error-Cause = Missing-Attribute
        Event-Timestamp = 1130951518
Detailed Packet Trace
    Code: 45 (Change-of-Authorize-Nak)
    Id: 4
    Length: 32
    Authenticator: 19 CC 06 88 92 4E 97 A8 FF ED FE 27 89 1C 17 BF
        Attribute Type: 101 (Error-Cause)
            Length: 6
            Value: 00 00 01 92                    ....
                (Missing-Attribute)
        Attribute Type: 55 (Event-Timestamp)
            Length: 6
            Value: 43 68 F4 32                    Ch.2
                (1130951730)
COA Ack
RADIUS COA Tx PDU, from 192.20.20.2:3799 to 192.20.20.1:1645 (32)
PDU-dict=starent-vsa1
    Code: 44 (Change-of-Authorize-Ack)
    Id: 3
    Length: 32
    Authenticator: 41 20 3C B7 26 DC BE E7 E7 A0 01 CA 57 53 10 94
        Event-Timestamp = 1130951518
Detailed trace:
    Code: 44 (Change-of-Authorize-Ack)
    Id: 4
    Length: 32
    Authenticator: 19 CC 06 88 92 4E 97 A8 FF ED FE 27 89 1C 17 BF
        Attribute Type: 55 (Event-Timestamp)
            Length: 6
            Value: 43 68 F4 32                    Ch.2
                (1130951730)
```

Figure 11:
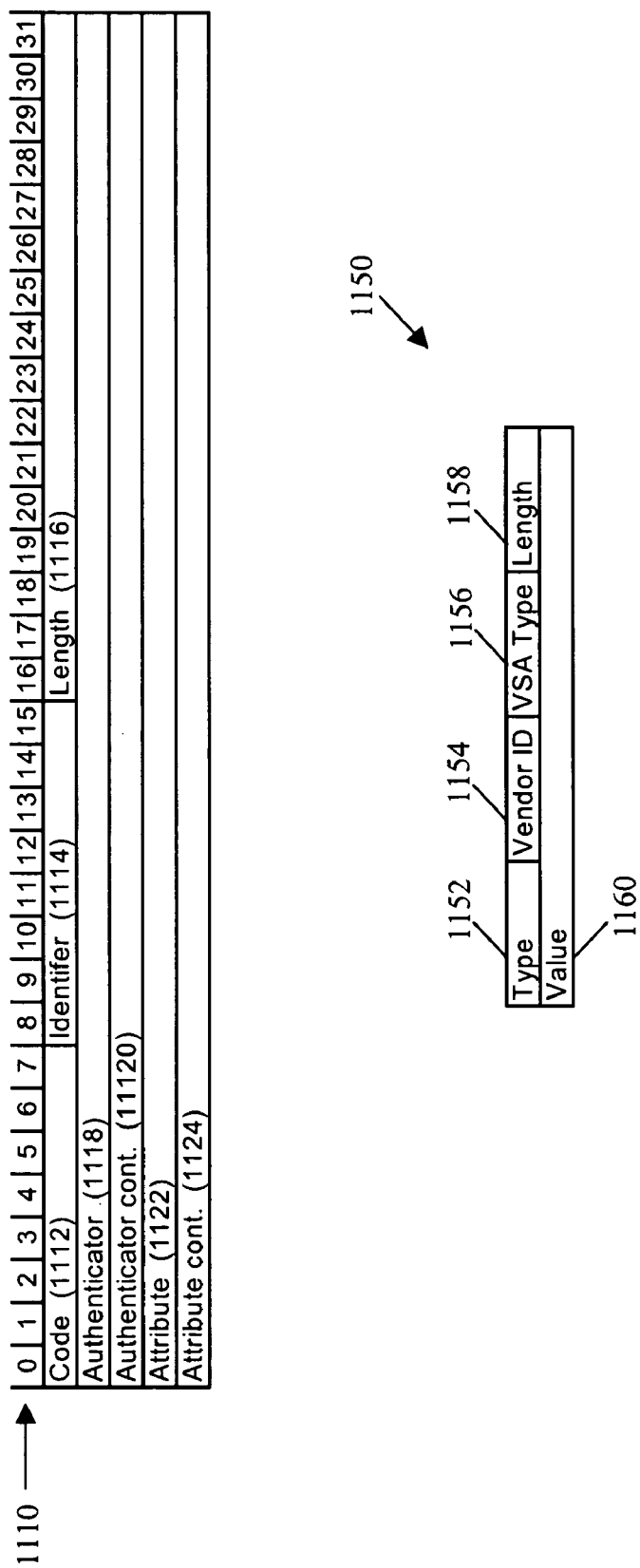
FIG. 11 is a diagram of how messaging information can be arranged in a message in accordance with certain embodiments of the invention.

FIG. 11 is a diagram of how messaging information can be arranged in a message in accordance with certain embodiments of the invention. Illustrated message 1100 can be represented according to a number of bits 1110. As one practiced in the field would appreciate the number of bits used for fields in message 1100 can be altered. A code 1112 can be used to indicate the type of message such as access-request, access-accept, access-reject, COA, or disconnect-message. An identifier 1114 is used to match a request with a response, and may be a number that is sequentially incremented. A duplicate message can be detected by checking identifier 1114 along with other IDs included in the message such as a framed-IP address. A length 1116 indicates the length of the message including code 1112, identifier 1114, length 1116, authenticator 1118, authenticator cont. 1120, attribute 1122, and attribute cont. 1124. An authenticator 1118, which can continue more than one row as indicated by authenticator cont. 1120, can be used to validate the message as well as provide information that can be used to create the authenticator that may be used in a message response. An attribute 1122 is variable in length depending on the number of attributes included and the type of attribute included, as indicated by attribute cont. 1124. Attributes provide additional information that can be used in communicating policy information and identifying subscriber sessions and traffic flows.

Illustrated attribute 1150 can include a number of fields. A type field 1152 can indicate the type of attribute information that follows such as user name, NAS-IP-Address, and SN1-IP-In-ACL. A vendor ID 1154 can represent the vendor that uses a particular message format. A vendor specific attribute (VSA) type 1156 can indicate the type of attribute that is specific to a particular vendor. Illustrated vendor ID 1154 and VSA type 1156 can be used together to determine the attribute information included. A length 1158 indicates the size of attribute 1150. A value 1160 can indicate a specific action to take or provide other information that can be used in applying/removing/modifying policies, identifying policies, subscriber sessions, or traffic flows, or indicating errors that may have occurred. As was explained above, one or more attributes may be included in a message 1100.

In certain embodiments of the invention, new attributes known as a policy accounting capability (PAC) is used in the interface messaging. The PAC attributes, which can be a Radius vendor specific attributes, define an accounting capability through one or more policies in a policy enforcement point and are used for enforcing or collecting charging information. A Charging-Rule-Install attribute is used for installing or modifying charging rules for a policy enforcement point as instructed from the policy server. A Charging-Rule-Name is another attribute that serves as a reference for activating a specific charging rule predefined at the policy enforcement point. A Charging-Rule-Base-Name attribute is a reference for activating a group of charging rules predefined at the policy enforcement point. A Charging-Rule-Definition attribute is used for installing or modifying charging rules supplied over the interface to the policy enforcement point.

A Charging-Rule-Remove attribute is used for removing charging rules from a policy enforcement point. Charging-Rule-Name attribute is a reference for removing a specific charging rule at the policy enforcement point or for deactivating a specific charging rule predefined at the policy enforcement point. A Charging-Rule-Base-Name attribute is a reference for deactivating a group of charging rules predefined at the policy enforcement point.

A Charging-Rule-Definition attribute defines the charging rule for a service flow sent by the policy server to the policy enforcement point. The Charging-Rule-Name attribute can uniquely identify the charging rule for a policy enforcement point and is used to reference to a charging rule in communication between the policy enforcement point and the policy server. The Flow-Description attribute determines the traffic that belongs to the service flow.

In some embodiments, if optional attributes within a Charging-Rule-Definition attributes are omitted, but corresponding information are provided in previous interface messages, the previous information remains valid. If Flow-Description attributes are supplied, these attributes replace all previous Flow-Description attributes. If Flows attributes are supplied, they replace all previous Flows attributes.

A Charging-Rule-Base-Name attribute indicates the name of a pre-defined group of charging rules residing at the policy enforcement point. A Charging-Rule-Name attribute can uniquely identify a charging rule for a policy enforcement point for charging rules provided by the policy server. For charging rules pre-defined at the policy enforcement point the Charging-Rule-Name attribute can uniquely identify a charging rule within the policy enforcement point. The Event-Trigger attribute indicates an event that can cause a re-request of charging rules. The following values are defined below in Table 3:

TABLE 3

Event-Trigger Attribute Values

| Value | Action |
|---|---|
| 0 | Used to indicate that upon the change of the access gateway (e.g., serving SGSN or PDSN) charging rules are to be requested. |
| 1 | Used to indicate that the upon QoS change charging rules are to be requested. |
| 2 | Used to indicate that the upon a remote access terminal (RAT) change charging rules are to be requested. |
| 3 | Used to indicate that the upon traffic flow template (TFT) change charging rules are to be requested. |

In some embodiments, software needed for implementing a process includes a high level procedural or an object-orientated language such as C, C++, C#, Java, or Perl. The software may also be implemented in assembly language if desired. The links or mapping may be implemented by pointers, memory references, or any other applicable method. The database or virtual database may be created by a number of different data structures such as arrays, linked-lists, trees, associative arrays, stacks, and queues. In certain embodiments, the software is stored on a storage medium or device such as read-only memory (ROM), programmable-read-only memory (PROM), or magnetic disk that is readable by a general or special purpose-processing unit to perform the processes described in this document. In some embodiments, a packet data serving node (PDSN) or Home Agent (HA) can be implemented on a Starent Networks Corporation of Tewksbury, Mass. ST-16 Intelligent Mobile Gateway.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

We claim:

1. A system comprising:
 a policy enforcement point in communication with a mobile subscriber that maintains one of a subscriber session and a traffic flow; and
 an interface to the policy enforcement point in communication with a policy server for dynamic update of quality of service policy enforced on the one of a subscriber session and a traffic flow, wherein the policy enforcement point:
  requests a requested quality of service policy from the policy server using a Radius-based access-request message including information identifying the one of a subscriber session and a traffic flow;

receives at least one of a Radius-based access-accept
message and Radius-based access-reject message
from the policy server in response to the requested
quality of service policy;
receives from the policy server with a Radius-based
change-of-authorization message an unsolicited quality of service policy that is independent of the
requested quality of service policy; and
enforces at least one of the requested quality of service
policy and the unsolicited quality of service policy on
the one of a subscriber session and a traffic flow,
wherein the unsolicited quality of service policy is generated due to modification of the quality of service
policy enforced on the one of a subscriber session and
a traffic flow, and
wherein the modification of the quality of service policy
is related to an anticipated flow of data traffic to the
policy enforcement point.

2. The system of claim 1, wherein the policy enforcement point includes a packet data serving node (PDSN).

3. The system of claim 1, further comprising:
an application server in communication with the mobile subscriber and the policy server;
wherein the application server receives information from the mobile subscriber to initiate an application.

4. The system of claim 3, wherein the interface receives the Radius-based change-of-authorization message including attributes for providing Quality of Service (QoS) enforcement relating to the application initiated by the mobile subscriber.

5. The system of claim 1, wherein the interface receives the Radius-based change-of-authorization message including at least one of User-name, Service-type, and Filter Id attributes.

6. The system of claim 1, further comprising the interface receiving a disconnect message from the policy server.

7. A method comprising:
establishing a subscriber session with a mobile subscriber on a policy enforcement point in communication with the mobile subscriber;
sending a Radius-based access-request message to request a requested quality of service policy from the policy enforcement point to a policy server including information identifying the subscriber session;
receiving at least one of a Radius-based access-accept message and Radius-based access-reject message from the policy server in response to the requested quality of service policy;
receiving from the policy server with a Radius-based change-of-authorization message an unsolicited quality of service policy that is independent of the requested quality of service policy; and
applying at least one of the requested quality of service policy received in the Radius-based access-accept message and the unsolicited quality of service policy received in the Radius-based change-of-authorization message at the policy enforcement point to the subscriber session.

8. The method of claim 7, further comprising:
receiving a flow setup request message at the policy enforcement point; and
sending a Radius-based access-request message, including information to setup a traffic flow, from the policy enforcement point to a policy server.

9. The method of claim 8, wherein the unsolicited quality of service policy is generated due to modification of quality of service policy enforced on the traffic flow.

10. The method of claim 7, further comprising:
receiving a renegotiate message from the mobile subscriber;
sending a Radius-based access-request message from the policy enforcement point to the policy server to terminate the subscriber session; and
sending a Radius-based access-request message from the policy enforcement point to the policy server to initiate a new session.

11. The method of claim 7, further comprising:
receiving a disconnect message from the policy server; and
disconnecting the subscriber session at the policy enforcement point.

12. The method of claim 7, wherein the policy enforcement point includes a packet data serving node (PDSN).

13. The method of claim 7, wherein the unsolicited quality of service policy is generated due to modification of quality of service policy enforced on the subscriber session.

14. A policy enforcement point providing policy enforcement on one of a subscriber session and a traffic flow, comprising:
a first interface for communicating with the mobile subscriber; and
a second interface for communicating with a policy server for dynamic update of quality of service policy enforced on the one of a subscriber session and a traffic flow;
the policy enforcement point programmed to:
maintain the one of a subscriber session and a traffic flow with the mobile subscriber;
send an access-request message for a requested quality of service policy to the policy server;
receive at least one of an access-accept message and access-reject message from the policy server in response to the requested quality of service policy;
receive with a change-of-authorization message from the policy server an unsolicited quality of service policy that is independent of the requested quality of service policy; and
enforce at least one of the requested quality of service policy and the unsolicited quality of service policy on the one of a subscriber session and a traffic flow,
wherein the unsolicited quality of service policy is generated due to modification of the quality of service policy enforced on the one of a subscriber session and a traffic flow, and
wherein the modification of the quality of service policy is related to an anticipated flow of data traffic to the policy enforcement point.

15. The system of claim 14, wherein the policy enforcement point includes a packet data serving node (PDSN).

16. The system of claim 14, wherein the policy enforcement point is further programmed to send a change-of-authorization message acknowledge message to the policy server in response to enforcing the unsolicited policy.

* * * * *

UNITED STATES PATENT AND TRADEMARK OFFICE
CERTIFICATE OF CORRECTION

PATENT NO. : 8,041,825 B2  
APPLICATION NO. : 11/584450  
DATED : October 18, 2011  
INVENTOR(S) : Andrew Gibbs et al.

Page 1 of 1

It is certified that error appears in the above-identified patent and that said Letters Patent is hereby corrected as shown below:

Column 18, lines 56-59  
Please correct claim 16 to read:

16. The system of claim 14, wherein the policy enforcement point is further programmed to send a to send a change-of-authorization message ~~acknowledge~~ acknowledgement message to the policy server in response to enforcing the unsolicited policy.

Signed and Sealed this  
Fourteenth Day of February, 2012

David J. Kappos  
*Director of the United States Patent and Trademark Office*